United States Patent
Hsieh et al.

(10) Patent No.: US 9,057,965 B2
(45) Date of Patent: Jun. 16, 2015

(54) METHOD OF GENERATING A SET OF DEFECT CANDIDATES FOR WAFER

(71) Applicant: TAIWAN SEMICONDUCTOR MANUFACTURING COMPANY, LTD., Hsinchu (TW)

(72) Inventors: Min-Hsin Hsieh, Zhubei (TW); Tsung-Hsien Lee, Tainan (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 13/692,396

(22) Filed: Dec. 3, 2012

(65) Prior Publication Data

US 2014/0157213 A1    Jun. 5, 2014

(51) Int. Cl.
*G06F 17/50* (2006.01)
*G03F 7/20* (2006.01)
*G03F 1/00* (2012.01)

(52) U.S. Cl.
CPC ............. *G03F 7/705* (2013.01); *G03F 1/144* (2013.01); *G06F 17/5045* (2013.01)

(58) Field of Classification Search
CPC .............. G06T 2207/30148; H01L 21/67288; H01J 2237/2817; G03F 7/706; G03F 2/144; G03F 17/5045

USPC ................................................... 716/100, 52
See application file for complete search history.

(56) References Cited

U.S. PATENT DOCUMENTS

| | | | |
|---|---|---|---|
| 2002/0114506 A1* | 8/2002 | Hiroi et al. | 382/149 |
| 2012/0233542 A1* | 9/2012 | Funakoshi | 715/243 |
| 2012/0262709 A1* | 10/2012 | Uto et al. | 356/237.2 |
| 2012/0296576 A1* | 11/2012 | Shibata et al. | 702/40 |
| 2013/0112872 A1* | 5/2013 | Obara et al. | 250/310 |
| 2013/0228685 A1* | 9/2013 | Obara et al. | 250/310 |
| 2013/0307963 A1* | 11/2013 | Sakai et al. | 348/87 |
| 2013/0315468 A1* | 11/2013 | Toyoda et al. | 382/147 |
| 2013/0343632 A1* | 12/2013 | Urano et al. | 382/149 |

* cited by examiner

*Primary Examiner* — Stacy Whitmore
*Assistant Examiner* — Magid Dimyan
(74) *Attorney, Agent, or Firm* — Lowe Hauptman & Ham, LLP

(57) ABSTRACT

A method of generating a set of defect candidates for a wafer includes generating a filtration area according to a graph operation of one or more of a plurality of layout areas. The wafer includes at least one die manufactured according to a mask, and the mask is prepared by combining the plurality of layout areas. The method further includes generating the set of defect candidates by omitting a subset of initial defect candidates having positions within the filtration area.

22 Claims, 6 Drawing Sheets

METHOD OF GENERATING A SET OF DEFECT CANDIDATES FOR WAFER

BACKGROUND

Integrated circuit (IC) fabrication processes include, among other things, lithographic processes that transfer predetermined IC layout patterns provided on the masks to various layers of materials for forming different elements on a wafer. In some applications, the predetermined IC layout patterns on a mask are first transferred to a photoresist layer and optionally to a patterned hard mask layer according to the patterned photoresist layer. Based on the patterned photoresist layer and/or the patterned hard mask layer, one or more etching or deposition processes are performed to form the elements as defined by the mask. Prior to the next pattern transferring stage, a wafer inspection process is sometimes performed to identify defect candidates for the wafer. The defect candidates may include actual defects and false alarms (i.e., false defects). The defect candidates are further examined using a Scanning Electron Microscope (SEM), and one or more remedial measures are taken according to a result of the SEM examination.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
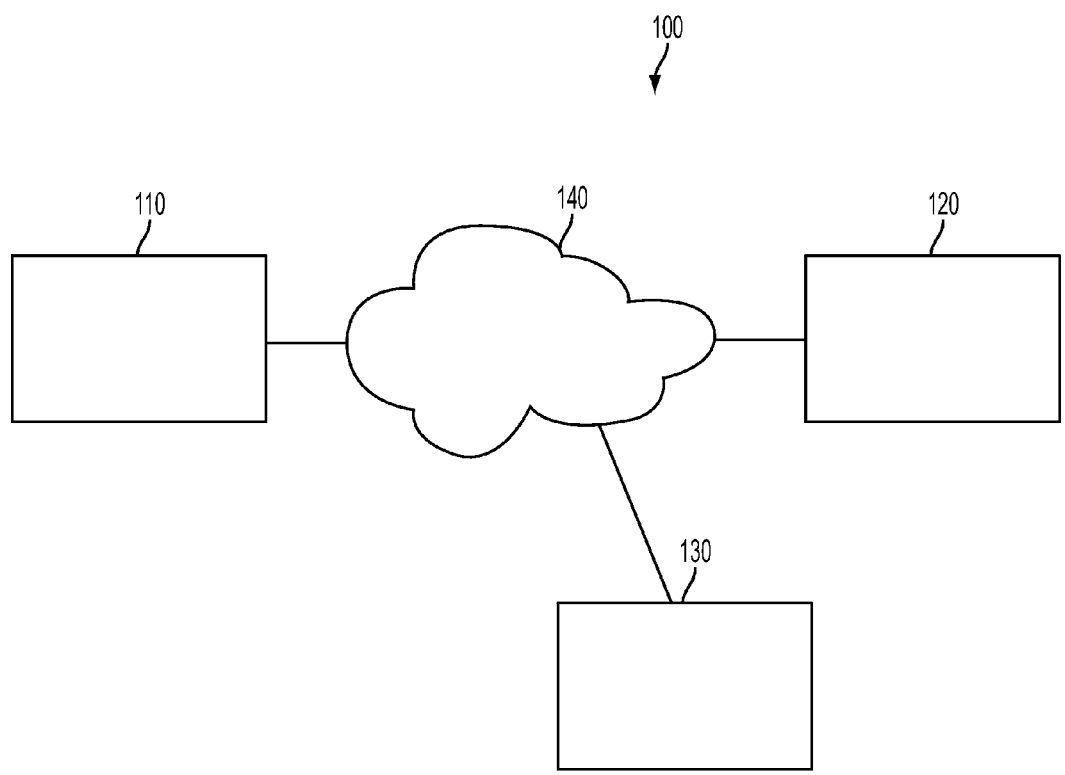
FIG. 1 is a system block diagram of a wafer inspection system in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

Moreover, spatially relative terms, for example, "lower," "upper," "horizontal," "vertical," "above," "below," "up," "down," "top," "bottom," "left," "right," etc. as well as derivatives thereof (e.g., "horizontally," "downwardly," "upwardly," etc.) are used for ease of reference in describing the relationship of features. The spatially relative terms are intended to cover different orientations of the device including the features.

FIG. 1 is a system block diagram of a wafer inspection system 100 in accordance with one or more embodiments. The wafer inspection system 100 includes a wafer-scanning device 110, two computers 120 and 130, and a network 140. The wafer-scanning device 110 and the computers 120 and 130 are connected to the network 140. In some embodiments, the communication among the wafer-scanning device 110, the computers 120 and 130, and the network 140 are in compliance with one or more communication protocols, such as a wireless communication protocol including BLUETOOTH, WIFI, WIMAX, GPRS, and WCDMA or a wired communication protocol including ETHERNET, USB, or IEEE-1394, and/or a proprietary communication protocol. In some embodiments, the computers 120 and 130 are connected to the wafer-scanning device 110 directly, and the network 140 is omitted. In some embodiments, the computer 130 is omitted. In some embodiments, more than two computers 120 and 130 and/or other devices are connected to the network 140.

The wafer-scanning device 110 emits light, of a predetermined spectrum from one or more light sources, onto a to-be-inspected wafer positioned in the wafer-scanning device. The wafer-scanning device 110 further receives reflected and/or transmitted light signals from the wafer and identifies one or more initial defect candidates and corresponding positions of the identified initial defect candidates with respect to the wafer by analyzing the reflected and/or transmitted light signals. In some embodiments, the predetermined spectrum is ultraviolet spectrum or visible light spectrum. In some embodiments, the initial defect candidates include at least one actual defect and one false defect. The actual defect refers to residue particles, cracks, shorts, or other deformation of the elements formed on the wafer that are likely to cause malfunction of the corresponding integrated circuit. The false defect, on the other hand, refers to imperfections on the wafer that are not likely to cause malfunction of the corresponding integrated circuit, such as discolored materials caused by process variation, but which demonstrates an optical characteristic similar to an actual defect. In other words, the actual defects and the false defects are not discernible to the wafer-scanning device 110.

The initial defect candidates are transmitted to the computer 120 to further filter out the false defects. In some embodiments, the wafer includes at least one die manufactured according to a mask, and the mask is prepared by combining a plurality of layout areas. In some embodiments, the boundary areas between different layout areas do not have any elements to be formed therein. As a result, in some embodiments, the wafer-scanning device 110 tends to report an excessive amount of false defects in the boundary areas. Also, in some other embodiments, the residue particles, cracks, and deformation in the boundary areas do not impact the performance of the resulting integrated circuit. The computer 120 receives the initial defect candidates from the wafer-scanning device 110 and generates a set of filtered defect candidates by omitting a subset of the initial defect candidates which are located in a predetermined area. The omitted subset of the initial defect candidates comprises defect candidates that do not impact the performance of the resulting integrated circuit because of the location of the detect candidates in the predetermined area. The predetermined area is also referred to as a filtration area in the present disclosure.

In some embodiments, the filtration area is generated in a computer 130 different from the computer 120 that receives the initial defect candidates. In some embodiments, more than 99% of the initial defect candidates are screened by the utilization of the filtration area, and thus the filtered defect candidates have a much lower percentage of false defects than that of the initial defect candidates.

Figure 2:
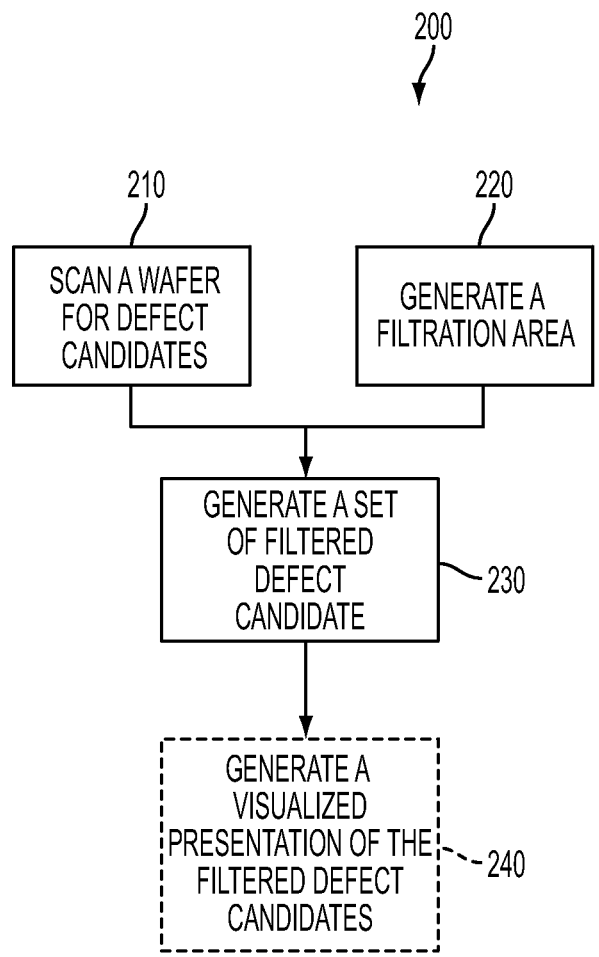
FIG. 2 is a flow chart of a method of generating a set of defect candidates for a wafer in accordance with one or more embodiments.

FIG. 2 is a flow chart of a method 200 of generating a set of defect candidates for a wafer in accordance with one or more embodiments. It is understood that additional processes may be performed before, during, and/or after the method 200 depicted in FIG. 2, and that some other processes may only be briefly described herein. In some embodiments, the method 200 is, partially or entirely, performed by the computer 120 or 130, such as a computer system 700 (FIG. 7) having a hardware processor 710 executing a set of computer readable instructions (such as computer program code 722).

In operation 210, a wafer-scanning device 110 scans a wafer and generates a list of initial defect candidates and the corresponding positions of the initial defect candidates with respect to the wafer. The wafer includes at least one die manufactured according to a mask, and the mask is prepared by combining a plurality of layout areas. In some embodiments, the plurality of layout areas comprises at least a layout area including a layout design corresponding to a digital circuit block, an analog circuit block, a memory circuit block, a power-device circuit block, or an intellectual property (IP) circuit block. In some embodiments, different layout areas are independent from each other and thus the boundary areas on the mask between different layout areas do not have any layout patterns.

In operation 220, a filtration area is generated according to a graph operation of one or more of the plurality of layout areas. The graph operation refers to generating a two-dimensional graph by manipulating one or more two-dimensional graphs (such as the plurality of layout areas on a mask) including expanding or shrinking one or more two-dimensional graphs, adding two-dimensional graphs, or subtracting one two-dimensional graph from another two-dimensional graph. In some embodiments, the graph operation is performed by the computer 130, and the resulting filtration area information is compiled in a graphic data format recognizable by a layout software program. The filtration area is then generated by another computer 120 based on the filtration area information from the computer 130. In some embodiments, the graphic data format includes a Graphic Database System (GDS) format or a GDS II format developed by Calma Company or an Open Artwork System Interchange Standard (OASIS) issued by Semiconductor Equipment and Materials International (SEMI).

In operation 230, the computer 120 receives the initial defect candidates from the wafer-scanning device 110. The computer 120 also generates the filtration area either by performing a graph operation by the computer 120 (operation 220) or by reconstructing the filtration area based on the filtration area information from another computer 130 (operation 230). The computer 120 further generates a set of filtered defect candidates by omitting a subset of the initial defect candidates having positions within the filtration area. In some embodiments, only the set of filtered defect candidates are subjected to further SEM examination.

In operation 240, the set of filtered defect candidates are optionally displayed on a display unit of the computer 120 (such as a display unit 740 of the computer system 700). A visualized presentation of the set of filtered defect candidates is generated by mapping the filtered defect candidates on a top view depiction of the wafer according to the position of the filtered defect candidates.

Figure 3:
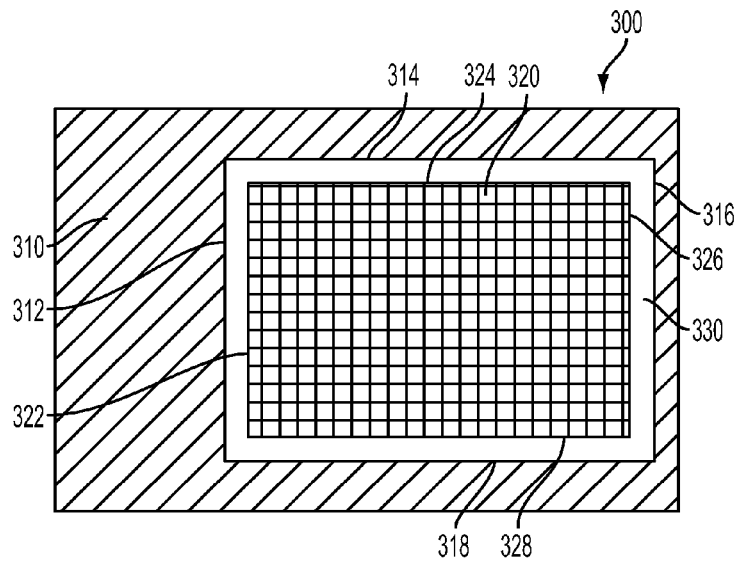
FIG. 3 is a top view of a mask including two layout areas in accordance with one or more embodiments.

FIG. 3 is a top view of a mask 300 including two layout areas 310 and 320 in accordance with one or more embodiments. Layout are 320 is positioned in an open portion within layout area 310. The layout areas 310 and 320 are separated by a boundary area 330, which does not have any layout pattern. The layout area 310 has interior peripheral edges 312, 314, 316, and 318, and the layout area 320 has exterior peripheral edges 322, 324, 326, and 328. The peripheral edges 312, 314, 316, and 318 are arranged to be adjacent to the peripheral edges 322, 324, 326, and 328, respectively. In some embodiments, the boundary area has 330 a width ranging from 0.5 µm to 1.0 µm. In some embodiments, the peripheral edges of the layout area 310 and the peripheral edges of the layout area 320 coincide within the boundary area 330. In yet some other embodiments, the layout areas 310 and 320 overlap within the boundary area.

In some embodiments, the initial defect candidates having positions within the boundary area 330 are ignorable because they are either false defects or real defects that do not impact the performance of the resulting integrated circuit. One of the available approaches for generating the filtration area is extending one of the layout area 310 or 320 and then subtracting the layout area 310 or 320 from the extended layout area. In some embodiments, the layout area, such as the example layout area 310 or 320 depicted in FIG. 3, are rectangular. In some embodiments, the layout area has various sizes and shapes.

Figure 4A:
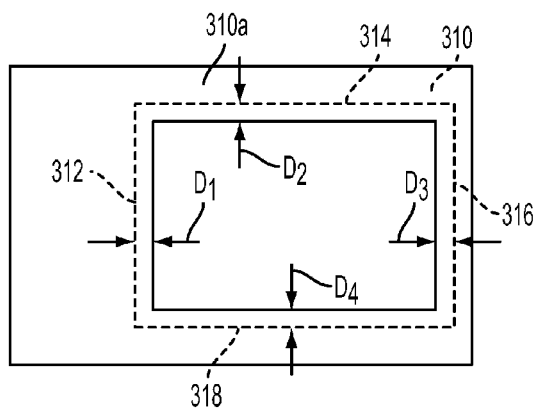
FIGS. 4A and 4B are top views of extended layout areas in accordance with one or more embodiments.
Figure 4B:
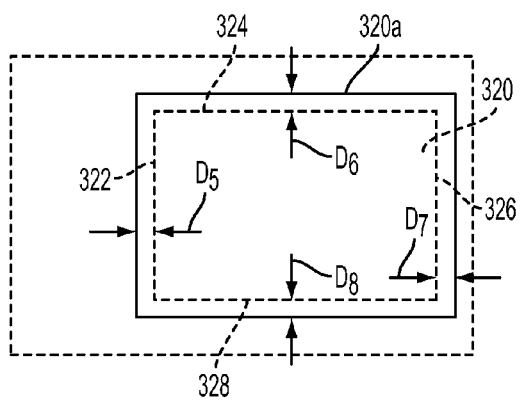
Figure 4C:
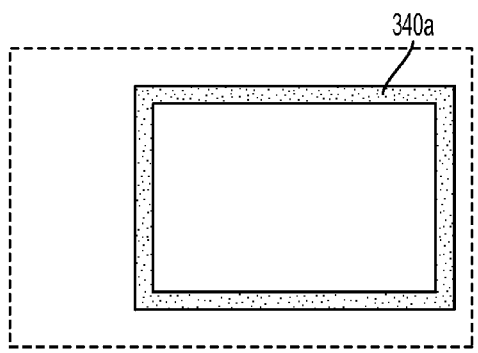
FIGS. 4C and 4D are top views of filtration areas for the mask depicted in FIG. 3 in accordance with one or more embodiments.
Figure 4D:
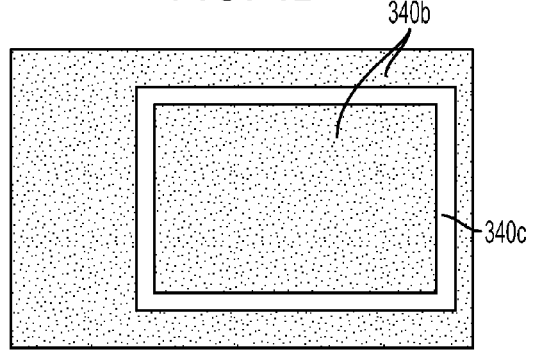

FIGS. 4A and 4B are top views of extended layout areas 310a and 320a in accordance with one or more embodiments. FIGS. 4C and 4D are top views of filtration areas 340a and 340b for the mask 300 depicted in FIG. 3 in accordance with one or more embodiments. As depicted in FIG. 4A, an extended layout area 310a is generated by shifting one or more of the peripheral edges 312, 314, 316, and 318 of the layout area 310 outwardly, i.e., away from an interior portion of the layout area 310, by a corresponding predetermined distance $D_1$, $D_2$, $D_3$, and $D_4$. The filtration area 340a (FIG. 4C) is generated by subtracting the layout area 310 from the expanded layout area 310a. In some embodiments, the predetermined distance $D_1$, $D_2$, $D_3$, or $D_4$ ranges from 0.5 µm to 1.0 µm. In at least one embodiment, the predetermined distances $D_1$, $D_2$, $D_3$, or $D_4$ have the same value.

As depicted in FIG. 4B, the filtration area 340a is generated by first generating an expanded area 320a based on the layout area 320 and subtracting the layout area 320 from the expanded layout area 320a. The extended layout area 320a is generated by shifting one or more of the peripheral edges 322, 324, 326, and 328 of the layout area 320 outwardly, i.e., away from an interior portion of the layout area 320, by a corresponding predetermined distance $D_5$, $D_6$, $D_7$, and $D_8$. In some embodiments, the predetermined distance $D_5$, $D_6$, $D_7$, or $D_8$ ranges from 0.5 µm to 1.0 µm. In at least one embodiment, the predetermined distances $D_5$, $D_6$, $D_7$, and $D_8$ have the same value.

In some embodiments, the graph operation for generating the filtration 340a includes subtracting a shrunk layout area instead of the original layout area 310 from an expanded first layout area 310a. The shrunk layout area is generated by shifting one or more of the peripheral edges 312, 314, 316, and 318 of the layout area 310 inwardly, i.e., toward the interior portion of the layout area 310, by one or more predetermined distances.

As depicted in FIG. 4D, in some embodiments, the defect candidates located outside the boundary area 330 are not subjected to further SEM inspection. In such scenario, a non-filtration area 340c is generated according to one of the approaches similar to those for the generation of the filtration area 340a. The filtration area 340b is subsequently generated by subtracting the non-filtration area 340c from a full area of the mask 300 (the full area of the mask 300 also denoted as 300 hereinafter) that encompasses all the plurality of layout areas 310 and 320.

Figure 5A:
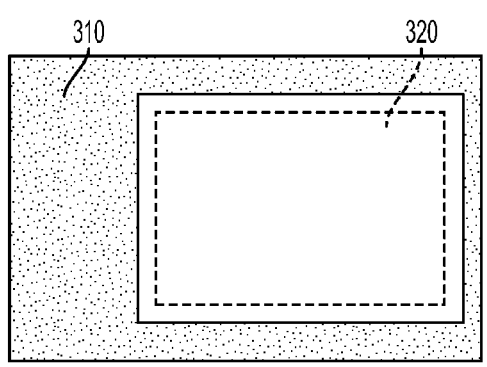
FIGS. 5A-5F are top views of filtration areas and/or non-filtration areas for the mask depicted in FIG. 3 in accordance with one or more embodiments.
Figure 5B:
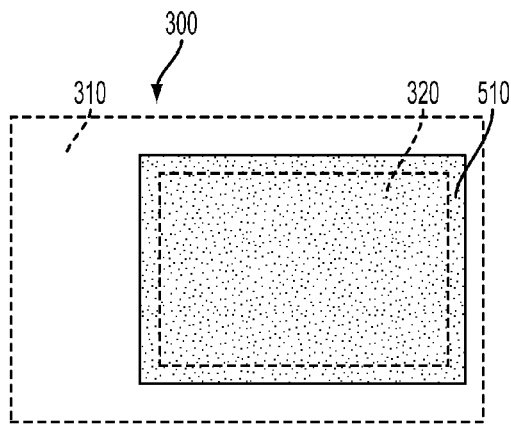
Figure 5C:
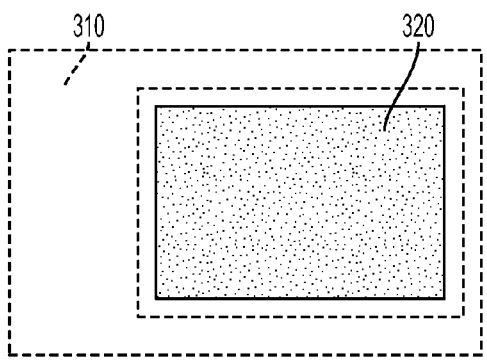
Figure 5D:
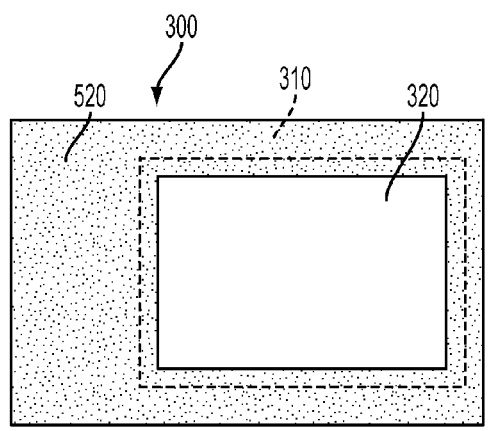

FIGS. 5A-5D are top views of filtration areas and/or non-filtration areas for the mask depicted in FIG. 3 in accordance with one or more embodiments. In the embodiment depicted in FIG. 5A, the layout area 310 is used as the filtration area. In the embodiment depicted in FIG. 5B, the layout area 310 is used as the non-filtration area, and the filtration area 510 is generated by subtracting the layout area 310 from the full area 300. In at least one embodiment as depicted in FIG. 5C, the layout area 320 itself is used as the filtration area. In yet another embodiment depicted in FIG. 5D, the layout area 320 is used as the non-filtration area, and the filtration area 520 is generated by subtracting the layout area 310 from the full area 300.

Figure 5E:
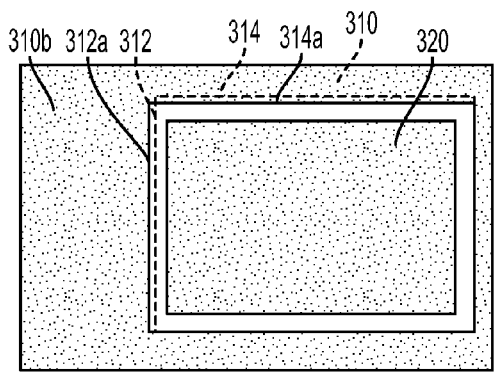
Figure 5F:
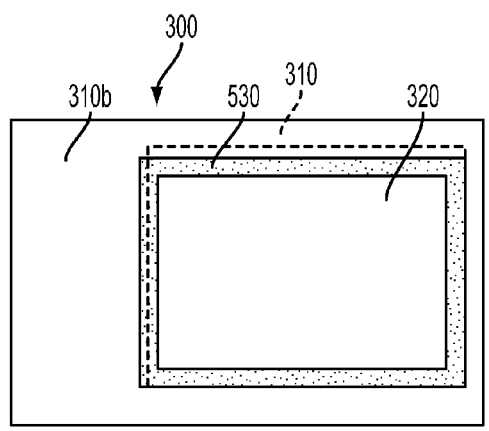

FIGS. 5E and 5F are top views of filtration areas and/or non-filtration areas for the mask depicted in FIG. 3 in accordance with one or more embodiments. In some embodiments, during the graph operation for generating the filtration area or the non-filtration area, a layout area, such as the layout area 310, is adjusted by shifting a portion of the periphery of the layout area 310 outwardly and shifting another portion of the periphery of the layout area 310 inwardly. For example, in FIG. 5E, the peripheral edge 312 is shifted inwardly to become a shifted peripheral edge 312a for an adjusted layout area 310b, and the peripheral edge 314 is shifted outwardly to become a shifted peripheral edge 314a for the adjusted layout area 310b. As depicted in FIG. 5F, in yet some other embodiments, the non-filtration area is generated by adding the shifted layout area 310b and the layout area 320, and the filtration area 530 is generated by subtracting the shifted layout area 310b and the layout area 320 from the full area 300.

Figure 6A:
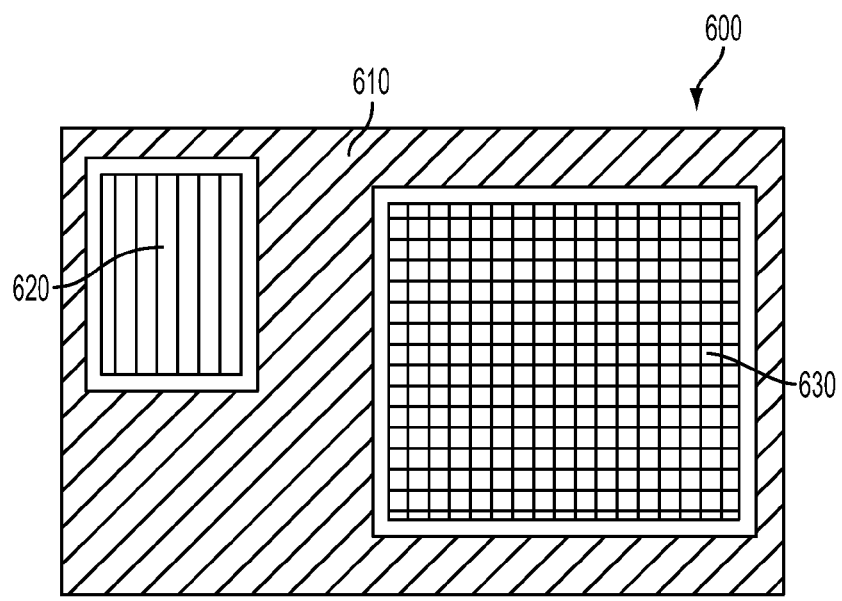
FIG. 6A is a top view of a mask including three layout areas in accordance with one or more embodiments.

FIG. 6A is a top view of a mask 600 including three layout areas 610, 620, and 630 in accordance with one or more embodiments. In some embodiments, the layout area, such as the example layout area 610, 620, or 630 depicted in FIG. 6A, are rectangular. In some embodiments, the layout area has various sizes and shapes.

Figure 6B:
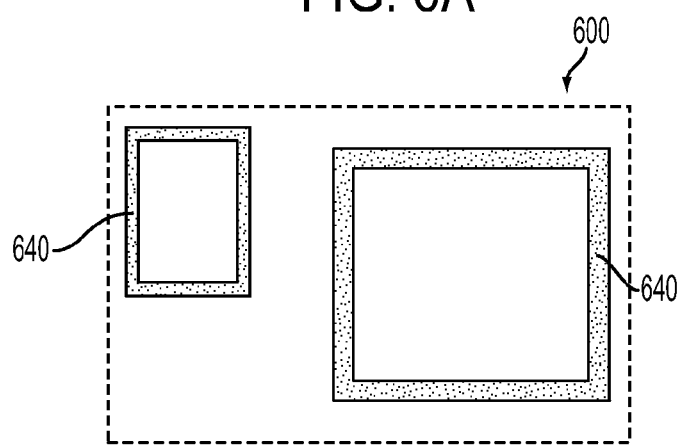
FIGS. 6B and 6C are top views of filtration areas and/or non-filtration areas for the mask depicted in FIG. 6A in accordance with one or more embodiments.

FIG. 6B is a top view of a filtration area 640 generated by performing a graph operation based on the layout areas 610, 620, and 630 in accordance with one or more embodiments. In some embodiments, the filtration area 640 is generated by expanding the layout area 610 and then subtracting the layout area 610 from the expanded layout area. In some embodiments, the filtration area 640 is generated by expanding the layout areas 620 and 630 and then subtracting the layout areas 620 and 630 from the expanded layout area. In at least one embodiment, the filtration area 640 is generated by subtracting the layout areas 610, 620, and 630 from a full area of the mask 600 (the full area of the mask 600 also denoted as 600 hereinafter).

Figure 6C:
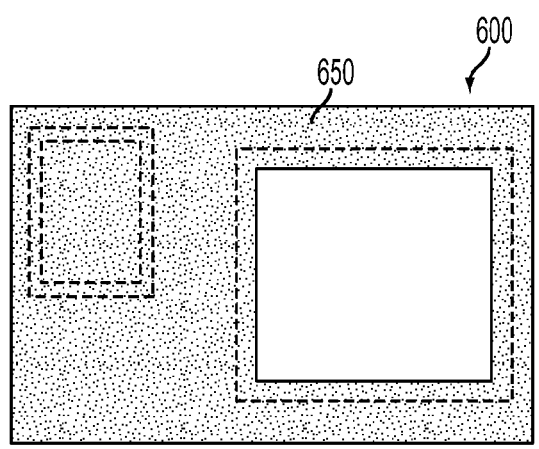

FIG. 6C is a top view of a filtration area 650 generated by performing a graph operation based on the layout area 630 in accordance with one or more embodiments. In some embodiments, not all of the layout areas 610, 620, and 630 of the mask 600 are used to generate the filtration area 650. As depicted in FIG. 6C, the filtration area 650 is generated by subtracting the layout area 630 from the full area of the mask 600. In some embodiments, the mask 600 is generated by combining more than three layout areas, and the graph operation for generating the filtration area is performed by using one or more of the layout areas and/or the full area encompassing all layout areas.

Figure 7:
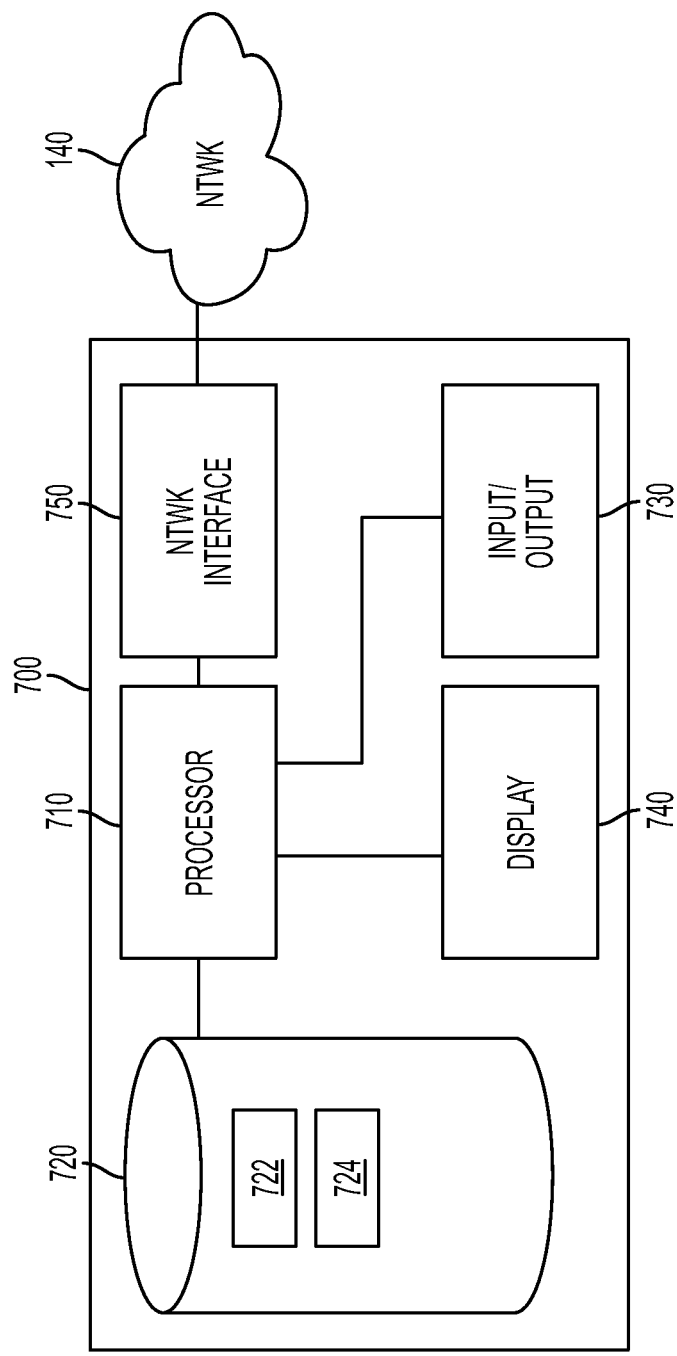
FIG. 7 is a functional block diagram of a computer system usable for implementing the method depicted in FIG. 2 in accordance with one or more embodiments.

FIG. 7 is a functional block diagram of a computer system usable for implementing the method disclosed in FIG. 2 in accordance with one or more embodiments. The computer system 700 is usable as the computer 120 or the computer 130 in FIG. 1.

Computer system 700 includes the hardware processor 710 and a non-transitory, computer readable storage medium 720 encoded with, i.e., storing, the computer program code 722, i.e., a set of executable instructions. The processor 710 is electrically coupled to the computer readable storage medium 720. The processor 710 is configured to execute the computer program code 722 encoded in the computer readable storage medium 720 in order to cause the computer 700 to be usable for performing a portion or all of the operations as depicted in FIG. 2.

In some embodiments, the processor 710 is a central processing unit (CPU), a multi-processor, a distributed processing system, an application specific integrated circuit (ASIC), and/or a suitable processing unit.

In some embodiments, the computer readable storage medium 720 is an electronic, magnetic, optical, electromagnetic, infrared, and/or a semiconductor system (or apparatus or device). For example, the computer readable storage medium 720 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 720 includes a compact disk-read only memory (CD-ROM), a compact disk-read/write (CD-R/W), and/or a digital video disc (DVD).

In some embodiments, the storage medium 720 stores the computer program code 722 configured to cause the computer system 700 to perform a method as depicted in FIG. 2. In some embodiments, the storage medium 720 also stores information 724 needed for performing the method 200 or generated during performing the method 200, such as the initial defect candidates, the filtered defect candidates, the filtration area information, the non-filtration area information, and/or one or more adjusted layout areas.

The computer system 700 includes, in at least some embodiments, an input/output interface 730 and a display unit 740. The input/output interface 730 is coupled to the processor 710 and allows an operator to manipulate the computer system 700 in order to perform the method depicted in FIG. 2. In at least some embodiments, the display unit 740 displays the status of operation of the method depicted in FIG. 2 in a real-time manner and preferably provides a Graphical User Interface (GUI). In at least some embodiments, the input/output interface 730 and the display 740 allow the operator to operate the computer system 700 in an interactive manner.

In at least some embodiments, the computer system 700 also includes a network interface 750 coupled to the processor 710. The network interface 750 allows the computer system 700 to communicate with the network 140, to which one or more other computer systems are connected. The network interface 750 includes wireless network interfaces such as BLUETOOTH, WIFI, WIMAX, GPRS, or WCDMA; or wired network interface such as ETHERNET, USB, or IEEE-1394. In some embodiments, the method of FIG. 2 is implemented in two or more computer systems 700 of FIG. 7, and information such as the initial defect candidates, the filtration area information, and/or the non-filtration area information are exchanged between different computer systems via the network 140.

In accordance with one embodiment, a method of generating a set of defect candidates for a wafer includes generating a filtration area according to a graph operation of one or more of a plurality of layout areas. The wafer includes at least one die manufactured according to a mask, and the mask is prepared by combining the plurality of layout areas. The method further includes generating the set of defect candidates having positions outside the filtration area.

In accordance with another embodiment, a non-transitory computer readable storage medium is encoded with a computer program code. The computer program code is arranged to cause a hardware processor to generate a filtration area for a wafer manufactured based on a mask, the mask including a plurality of layout areas. The computer program code is also arranged to cause the hardware processor to generate a set of filtered defect candidates by filtering out a subset of initial defect candidates located within the filtration area.

In accordance with yet another embodiment, a method of generating a non-care area between a first layout area and a second layout area of a mask includes expanding the first layout area by shifting a first peripheral edge of the first layout area outwardly by a first predetermined distance. The first peripheral edge of the first layout area is arranged to be adjacent to the second layout area on the mask. The method also includes generating the non-care area by subtracting the first layout area from the expanded first layout area.

The foregoing describes one or more features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a set of defect candidates for a wafer, the wafer comprising at least one die manufactured according to a mask, the mask being prepared by combining a plurality of layout areas, the method comprising:
   generating, by a hardware processor, a filtration area according to a graph operation of one or more of the plurality of layout areas, and the graph operation comprising at least expanding or shrinking the one or more of the plurality of layout areas;
   generating the set of defect candidates having positions outside the filtration area; and
   at least one of the following conditions:
   (a) wherein the plurality of layout areas comprises a first layout area and a second layout area, a first peripheral edge of the first layout area arranged to be adjacent to a first peripheral edge of the second layout area on the mask, and the graph operation comprises:
   expanding the first layout area by shifting the first peripheral edge of the first layout area outwardly by a first predetermined distance; and
   generating the filtration area by subtracting the first layout area from the expanded first layout area; or
   (b) wherein the plurality of layout areas comprises a third layout area and a fourth layout area, a first peripheral edge of the third layout area arranged to be adjacent to a first peripheral edge of the fourth layout area on the mask, and the graph operation comprises:
   expanding the third layout area by shifting the first peripheral edge of the third layout area outwardly by a second predetermined distance;
   shrinking the third layout area by shifting the first peripheral edge of the third layout area inwardly by a third predetermined distance; and
   generating the filtration area by subtracting the shrunk third layout area from the expanded third layout area; or
   (c) wherein the graph operation comprises:
   generating a non-filtration area according to the plurality of layout areas; and
   generating the filtration area by subtracting the non-filtration area from a full area encompassing all the plurality of layout areas.

2. The method of claim 1, under condition (a), wherein the first predetermined distance ranges from 0.5 µm to 1.0 µm.

3. The method of claim 1, under condition (a), wherein the first layout area has a second peripheral edge arranged to be adjacent to a second peripheral edge of the second layout area on the mask, and the expansion of the first layout area further comprises:
   expanding the first layout area by shifting the second peripheral edge of the first layout area outwardly by a fourth predetermined distance.

4. The method of claim 3, wherein the fourth predetermined distance ranges from 0.5 µm to 1.0 µm.

5. The method of claim 1, under condition (c), wherein the generation of the non-filtration area comprises:
   generating the non-filtration area by adding one or more of the plurality of layout areas.

6. The method of claim 1, under condition (c), wherein the plurality of layout areas comprises a fifth layout area and a sixth layout area, a first peripheral edge of the fifth layout area arranged to be adjacent to a first peripheral edge of the sixth layout area on the mask, and the generation of the non-filtration area comprises:
   adjusting the fifth layout area by shifting the first peripheral edge of the fifth layout area by a fourth predetermined distance; and
   generating the non-filtration area including the adjusted fifth layout area.

7. The method of claim 6, wherein the fifth layout area has a second peripheral edge arranged to be adjacent to a second peripheral edge of the sixth layout area on the mask, and the expansion of the first layout area further comprises:
   adjusting the fifth layout area by shifting the second peripheral edge of the fifth layout area by a fifth predetermined distance.

8. The method of claim 1, wherein the generation of the filtration area comprises:
   receiving filtration area information compiled in a graphic data format recognizable by a layout software program.

9. The method of claim 1, wherein the plurality of layout areas comprises a layout area including a layout design of a digital circuit block, an analog circuit block, a memory circuit block, a power-device circuit block, or an intellectual property (IP) circuit block.

10. A non-transitory computer readable storage medium encoded with a computer program code, the computer program code being arranged to cause a hardware processor to:
   generate a filtration area for a wafer manufactured based on a mask, the mask including a plurality of layout areas, the filtration area being generated according to a graph operation of one or more of the plurality of layout areas, and the graph operation comprising at least expanding or shrinking the one or more of the plurality of layout areas; and generate a set of filtered defect candidates by filtering out a subset of initial defect candidates located within the filtration area; and at least one of the following conditions:

(a) wherein the plurality of layout areas comprises a first layout area and a second layout area, a first peripheral edge of the first layout area being arranged to be adjacent to a first peripheral edge of the second layout area on a mask, and the generation of the filtration area comprises:

generating an expanded first layout area by shifting the first peripheral edge of the first layout area outwardly by a first predetermined distance; and generating the filtration area by subtracting the first layout area from the expanded first layout area;

(b) wherein the plurality of layout areas comprises a third layout area and a fourth layout area, a first peripheral edge of the third layout area arranged to be adjacent to a first peripheral edge of the fourth layout area on the mask, and the graph operation comprises:

expanding the third layout area by shifting the first peripheral edge of the third layout area outwardly by a second predetermined distance;

shrinking the third layout area by shifting the first peripheral edge of the third layout area inwardly by a third predetermined distance; and generating the filtration area by subtracting the shrunk third layout area from the expanded third layout area; or (c) wherein the generation of the filtration area comprises:

generating a non-filtration area according to the plurality of layout areas; and generating the filtration area by subtracting the non-filtration area from a full area encompassing all the plurality of layout areas.

11. The non-transitory computer readable storage medium of claim 10, under condition (c), wherein the generation of the non-filtration area comprises:

generating the non-filtration area by adding one or more of the plurality of layout areas.

12. The non-transitory computer readable storage medium of claim 10, wherein the generation of the filtration area comprises:

causing the hardware processor to receive filtration area information compiled in a graphic data format recognizable by a layout software program.

13. The non-transitory computer readable storage medium of claim 10, wherein the plurality of layout areas comprises a layout area including a layout design of a digital circuit block, an analog circuit block, a memory circuit block, a power-device circuit block, or an intellectual property (IP) circuit block.

14. The non-transitory computer readable storage medium of claim 10, under condition (a), wherein the first predetermined distance ranges from 0.5 µm to 1.0 µm.

15. The non-transitory computer readable storage medium of claim 10, under condition (a), wherein the first layout area has a second peripheral edge arranged to be adjacent to a second peripheral edge of the second layout area on the mask, and the expansion of the first layout area further comprises:

expanding the first layout area by shifting the second peripheral edge of the first layout area outwardly by a fourth predetermined distance.

16. The non-transitory computer readable storage medium of claim 10, wherein the fourth predetermined distance ranges from 0.5 µm to 1.0 µm.

17. The non-transitory computer readable storage medium of claim 10, under condition (c), wherein the plurality of layout areas comprises a fifth layout area and a sixth layout area, a first peripheral edge of the fifth layout area arranged to be adjacent to a first peripheral edge of the sixth layout area on the mask, and the generation of the non-filtration area comprises:

adjusting the fifth layout area by shifting the first peripheral edge of the fifth layout area by a fourth predetermined distance; and generating the non-filtration area including the adjusted fifth layout area.

18. A method of generating a boundary area between a first layout area and a second layout area of a mask, a first peripheral edge of the first layout area being arranged to be adjacent to the second layout area on the mask, the method comprising:

expanding, by a hardware processor, the first layout area by shifting the first peripheral edge of the first layout area outwardly by a first predetermined distance; and generating the boundary area by subtracting the first layout area from the expanded first layout area, wherein the first layout area or the second layout area comprises a layout design of a digital circuit block, an analog circuit block, a memory circuit block, a power-device circuit block, or an intellectual property (IP) circuit block.

19. The method of claim 18, wherein the first predetermined distance ranges from 0.5 µm to 1.0 µm.

20. The method of claim 18, wherein a second peripheral edge of the first layout area is arranged to be adjacent to the second layout area on the mask, and the method further comprises:

expanding the first layout area by shifting the second peripheral edge of the first layout area outwardly by a second predetermined distance.

21. The method of claim 20, wherein the second predetermined distance ranges from 0.5 µm to 1.0 µm.

22. The method of claim 18, further comprising:

compiling the boundary area in a graphic data format recognizable by a layout software program.

* * * * *